United States Patent Office 3,816,577
Patented June 11, 1974

3,816,577
METHOD OF DEODORIZING ANIMAL WASTE WITH CHERRY PIT EXTRACT
Edwin F. Neckermann, Kalamazoo, Mich., and James A. Hammer, Schaumburg, Ill., assignors to Beatrice Foods Co., Chicago, Ill.
No Drawing. Filed Apr. 14, 1972, Ser. No. 244,236
Int. Cl. A61l 13/00; A47k 11/00; E03d 9/00
U.S. Cl. 424—76     20 Claims

ABSTRACT OF THE DISCLOSURE

The present invention is concerned with deodorant materials for animal waste, and is especially concerned with a novel extract of cherry pits which has been found to be surprisingly effective for deodorizing animal waste.

---

With the increased popularity of housing animal pets in cages and the like in homes, there has been an increased need for effective animal waste deodorizers for use in those cages. Heretofore, deodorizer material for animal cages has consisted mainly of inert absorbent particulate material for absorbing animal waste, particularly urine, optionally with odor masking agents and the like. Among such materials which have been used are vermiculite, saw dust, kaolin, ground wood pulp and the like. Alternately, deodorizer materials for cages may be made with an absorbent paper or like constructed film, likewise having therein an odor masking material. While these deodorizing materials function effectively for relatively short periods of time, these known deodorizing materials require frequent changing in order to prevent objectionable odors from the animal cages.

Numerous efforts have been made in the art toward discovering more efficient alternates to the known deodorizing materials, but in view of the intended use for pets and the like, the art has long recognized that any alternate materials must be produced from relatively cheap starting materials in order that the products can be marketed at a cost consistent with deodorizing materials presently utilized.

Accordingly, it is an object of the present invention to provide a more effective animal waste deodorizing material which can be used for longer periods of time than conventional materials of this nature and which can be produced at a cost comparable with presently used animal waste deodorizing materials. It is a further object to provide a process for the production of the present animal waste deodorizing materials. Other objects will be apparent from the following disclosure and claims.

Briefly stated, it has now been discovered that the water soluble constituents of cherry pits provide a surprisingly effective animal waste deodorizer and that these water soluble constituents may be readily obtained by a water extraction process. The water soluble solids of cherry pits are a mixture of complex chemical compounds and the specific identity of those compounds is not fully known. However, the water extract of cherry pits contains about 10 to 25% fat, 30 to 60% protein, 20 to 45% carbohydrate and 1 to 5% ash, being mainly sodium chloride with small amounts of potassium, phosphorus and iron. Additionally, the extracts contains about ½ to 45 milligrams per 100 grams of cyanide, calculated as hydrogen cyanide. In regard to the composition, it has been discovered that the main active ingredient thereof is the protein portion of the extract and it is most important that this protein portion be conserved without degradation, such as denaturing, in order that an effective animal waste deodorizer be produced.

The present animal waste deodorizer may be obtained by simply extracting cherry pits, preferably ground, with a water containing solvent. It is necessary that the solvent contain significant amounts of water, since portions of the active ingredients for obtaining the deodorizing action are only water soluble. In this regard, the solvent may be otherwise as desired so long as the solvent chosen does not adversely affect the protein content of the cherry pits, as noted above, and so long as the solvent contains at least 5% water. It is, of course, most convenient, simply, to use water alone as the solvent.

The extraction step may be carried out in any desired fashion and it is only necessary that the cherry pits, preferably ground to increase the surface area thereof, be contacted with water for a sufficient length of time to substantially extract the water soluble components of the cherry pits. The extraction time will vary with the temperature of extraction, the average particle size of the cherry pits, either whole or ground, the degree of relative movement between the cherry pits and the solvent, e.g. the degree of agitation or the like, as well as the weight ratios of cherry pits to solvent. However, for most operations suitable extractions can be accomplished in as little as 10 minutes, but at least one hour and preferably at least two hours, e.g. four hours, or more is preferred. However, the extraction step must not proceed for such a length of time that substantial bacterial growth takes place therein. In this regard, bacteria are normally contained in cherry pits and the growth of that bacterial will take place during the extraction step. Hence, if the extraction step is prolonged or if precautions are not taken to prevent bacterial growth by inhibition or otherwise, the bacteria will act on the protein of the cherry pit and cause degradation thereof as noted above. Substantial degradation of the protein must be avoided in order to obtain the present product. Accordingly, the extraction step should not proceed for periods greater than eight days, and preferably the extraction step should not be continued beyond five days and generally the extraction should be complete within 24 hours. Extractions within the above time periods are easily accomplished simply by providing sufficient contact between the cherry pits and the solvent.

The particular manner of contacting the solvent and the cherry pits is not critical, so long as the above precautions are observed, and may take the form of simply agitating a slurry of the cherry pits in solvent, percolating the solvent through a bed of the cherry pits, continually circulating a slurry of the cherry pits and solvent through a pump or like fluid moving device, etc.

It is preferable that the cherry pits be ground to smaller particle sizes in order to accelerate the rate of extraction by the solvent and in this regard, any conventional grinding machinery may be used. The particular average particle size accomplished by such grinding step is not critical, and indeed no grinding need be practiced at all, but it is preferred that the grinding accomplish an average particle size as small as possible but yet consistent with the ability of conventional solid/liquid separating equipment to subsequently separate the extract from the solids. Hence, if it is intended to separate the solid portion from the liquid extract by use of a conventional filter, then the cherry pits should not be ground to a particle size so small that the particles will plug the filter cloth of that conventional filter. In a similar manner, if a solid bowl centrifuge is intended as the separation equipment, then the particle size should not be so small that effective separation of the solids and extract cannot be readily accomplished. In other words, the limit on the amount of grinding to smaller particle sizes of the cherry pits is determined only by the capabilities of the subsequent liquid/ separation step. For most purposes it has been found that average particle sizes between about that of a No. 6 and No. 325 U.S. Sieve Series, especially between about a No.

60 and No. 200 are suitable for most processing equipment, and will yet provide rapid extraction of the water soluble solids from the ground cherry pits. However, if filter aids are used, the size ranges may be lower, e.g. to micro sizes or lower.

In connection with the grinding step, it is noted that the oil contained in cherry pits causes significant amounts of friction during the grinding step, and, hence, elevates the temperature during grinding. As will be more fully explained below, it is necessary that both the cherry pits and the extract, from grinding through the final recovery of the product, never experience temperatures in excess of 180° F., and more preferably less than 170° F. This is necessary, since at temperatures greater than the foregiing, the protein portion of the cherry pits or the extract will denature and the desired animal waste deodorizing product will not be obtained. Under these circumstances, when grinding is utilized in the process, it is preferable that the oil of the cherry pits be removed prior to the grinding step in order to ensure that the excessive temperatures, noted above, are not produced in the grinding operation. The oil of the cherry pits may be extracted by solvent extraction with an oil solvating liquid, many of which are known to the art, or simply by pressing the cherry pits, either whole or cracked cherry pits, to express the oil therefrom. It is not necessary to remove all of the oil of the cherry pits, but sufficient amounts of the oil should be removed that undue friction and resulting heat will not be generated during the grinding step. It is, however, preferable to remove the oil from the cherry pits to the extent that the cherry pits contain no more than 10% by weight, and preferably no more than 5% by weight of oil. This will ensure that the grinding step does not generate excessive temperatures and further allow increased recovery of the cherry pit oil which is valuable in itself and which does not significantly contribute to the effectiveness of the animal waste deodorizer.

It is important that during the grinding step, if used, as well as in all subsequent steps of the process that the cherry pits and/or extract never experience temperatures in excess of 180° and preferably in excess of 170°, in order to avoid denaturing of the protein. In this regard, conventional expedients of temperature control should be utilized in each of the steps of the process. For example, cooling means may be used in the pressing and grinding steps and conventional temperature controls may be used in each subsequent step of the process.

After the extraction has been accomplished, the solid portion of the cherry pit which remains and the liquid extract should be separated in order to remove the nonactive solid portions. Any conventional solid/liquid separating devices may be employed for this step, such as filters, centrifuges and the like. Conveniently a rotary centrifuge such as manufactured by the Sharples Company, may be employed for separating the solids from the liquid extract of the cherry pits. The degree of separation of the solids from the liquid is not critical, and the separation is accomplished for the main purpose of simply removing nonactive ingredients which otherwise dilute the active extract. Generally speaking, however, it is desirable that the supernate of any separation step, such as centrifuging, contains less than 10% by weight of undissolved solids (as opposed to the dissolved solids which are active ingredients for the present deodorizers). However, greater amounts than this may remain in the supernate if desired.

The supernate of the separation step, when employed, is then preferably concentrated in order that the dissolved solids are contained in the supernate in concentrations sufficiently high for convenient utilization of the extract. Concentrations of dissolved solids to at least 3%, e.g. at least 7% by weight are conveniently accomplished with conventional equipment such as vacuum pan evaporators, multiple effect evaporators, crystallizers, and reverse osmosis membranes. Reverse osmosis allows the concentration of the active ingredients by simply contacting with a reverse osmosis membrane which will produce a concentrated stream and a diluted stream from the reverse osmosis membrane.

If desired, the supernate may be evaporated to dryness and the dry solids obtained therefrom can be utilized as the animal waste deodorizing material. However, since it is convenient to apply the active ingredients in liquid forms to an inert carrier to produce the animal waste deodorizing material, it is preferred, and of course more economical, to not entirely remove the liquid portion of the extract. This conserves the energy required for removing the liquid portion and allows a more simple process. Nevertheless, if it is desired to entirely or substantially entirely remove the liquid portion of the extract, this can be readily accomplished by any of the conventional means in the art, such as spray drying, vacuum pan drying and oven drying. Obtaining the dry product does have one advantage in that the dry product can subsequently be redissolved in a desired amount of water or other solvent to readily produce any concentration of the active ingredients.

It should be particularly noted, however, that in any concentrating or drying step, such as those noted above, the temperature during that step must be maintained at below 180° F. and more preferably below 170° F., for the reasons noted above. Otherwise, the desired active ingredients will not be obtained.

The active ingredients obtained from the extract either by complete drying or contained in the extract with concentration thereof, is disposed on a porous carrier in order to present the active ingredients with sufficient surface area in a cage or the like to more economically control animal waste odors. Any of the conventional porous carriers may be used and the particular carrier is not at all critical. However, there may be suitably used carriers such as clays, diatomaceous earth, alumina, ground vegetable matter, e.g. corncobs, corn and sugar cane stalks, bagasse, wood products such as saw dust, shaving chips and paper, porous plastics such as foams, e.g. polystyrene and the like, either ground or in sheet form, common dirt and the like. The inert carrier may be in particulate form or it may be in sheet form. If the inert carrier is in particulate form, it can be formed into sheets by use of conventional binder glues such as gelatin and the like.

Hence, in the preferred form of the invention, there is provided a process for producing an animal waste deodorizing comprising removing at least part of the natural oil from cherry pits, preferably so that the remaining cherry pits contain less than 10% by weight of oil, drying the cherry pits either prior to or subsequent to removal of the oil, grinding the cherry pits, preferably to particle sizes corresponding to a U.S. Sieve Series of between 6 and 325, contacting the ground cherry pits with an aqueous solvent, preferably water alone, for a sufficient time to dissolve and extract the water soluble solids from the ground cherry pits, preferably about four hours in a stirred slurry of the ground cherry pits and the water, separating the solution of the water soluble solids from the nondissolved solids of the cherry pits, preferably by way of centrifugation or filtration, concentrating the solution of the water soluble solids of the cherry pits to at least 1% and preferably at least 3 or 7%, by weight of the solution, by means of evaporation or reverse osmosis, absorbing the concentrated solution of the water soluble solids of the cherry pits on an inert carrier, either in particulate form or in sheet form. However, all of the foregoing steps must be carried out at temperature below 180°. There is, however, no critical minimum temperature for carrying out the steps so long as the temperature used is consistent with adequate execution of the steps. For example, obviously, since the extractions step which is carried out with a liquid phase, the solvent must be at a temperature above the freezing point thereof.

Hence, the process produces the separated water soluble solids of cherry pits in a concentrated solution thereof. Alternately the process can produce the separated water soluble solids of cherry pits in a dry form, by drying a solution thereof. And ultimately, the separated water soluble solids of the cherry pits are disposed on an inert porous carrier, as described above.

As previously discussed, the extract chemical composition of the water extract of the cherry pits is not known, but it is clear that the protein portion of the extract is important as an active ingredient. Nevertheless, it is clear that the active ingredients perform some chemical reaction with animal waste, and especially urine, to chemically tie up or otherwise remove odoriferous components of animal waste. Cyanides have been identified in the extract as well as amygdalin, and in an effort to determine the role played by these two identifiable ingredients, tests have been conducted with animal waste using substantially purified cyanides and amygdalin, but the control of odors from animal waste with these two compounds is considerably less effective than the control with the total extract, as described above. Due to the complexity of the compounds in the extract it has, hence, not been possible to isolate and identify the active ingredient or ingredients of the water soluble solids, and the present animal waste deodorizer must include the entire water soluble solids to ensure effective control of animal waste odors.

The water extract of the cherry pits will allow bacterial growth, as noted above, and since complete sterilization of the liquid extract would require temperatures dangerously close to the maximum temperature, as discussed above, it is not recommended that sterilization be attempted. However, bacterial growth can be substantially reduced, if storage of the extract is desired, by further concentrating the extract to above 10% by weight of dissolved solids and more preferably above 25% by weight of dissolved solids. Alternately, inert solids may be dissolved in the extract to increase the total dissolved solids content and hence reduce the rate of bacterial growth. In this regard, here again, the total dissolved solids (including the water soluble extract solids and the inert solids) should be above 10% and preferably at least 25%. Suitably, the dissolved inert solids may be a gel forming solid such as the alginates and the like to produce a viscous gel, which will again reduce the rate of bacterial growth.

For best storage, it is preferred that the solution of extract be concentrated and inert solids dissolved therein, as noted above, and the solution of the extract and dissolved inert solids be dried to a low moisture content, e.g. below 7% more preferably below 3%, to substantially prevent bacterial growth of the dried powder. In this regard, spraying drying is a very convenient method of accomplishing the same.

The following Examples will illustrate the invention, but it is to be clearly understood that the invention is fully applicable to the breadth of the foregoing disclosure and it is not limited to the specific examples.

EXAMPLE 1

Commercially available dried cherry pits were pressed in a conventional press to remove the natural cherry oil therefrom until the pressed cherry pits contain approximately 10% by weight of remaining oil. The pressing was accomplished in a manner to prevent the temperature of the cherry pits from exceeding 180° F. The pressed cherry pits were ground in a conventional Fitz mill using a 000 screen to produce a cherry pit flour. The cherry pit flour was added to a stirred vat of water at 70° F. until the flour was approximately 10% by weight of the slurry resulting therefrom. This slurry was agitated at 70° F. for four hours. The slurry was then charged to Sharple Super Decanter centrifuge and the supernate thereof was evaporated in a vacuum pan to a dissolved solids content of approximately 10%. Sodium alginate was added to the concentrated extract until the total dissolved solids in the extract was approximately 25%. This solution was spray dried in a conventional spray drying apparatus at 160° F. outlet temperature to a dry powder having approximately 3% moisture therein. The dry powder was suitable for long term storage.

EXAMPLE 2

A portion of a powder of Example 1 was dissolved in water until a total solids content of 25% was reached. The solution was then suitable for disposing on an inert porous carrier for producing the animal waste deodorizer.

EXAMPLE 3

A portion of the liquid of Example 2 was mixed with common clay to a point before wetness occurred. The mixture was then placed at the bottom of a cage having hamsters therein and prevented significant waste odors for a period of four weeks.

EXAMPLE 4

A portion of the liquid of Example 2 was sprayed on Kraft paper and allowed to dry. The paper was placed at the bottom of a cage housing birds and the paper prevented significant waste odor for a period of three weeks.

It should be clearly understood, that the present deodorizer is useful for deodorizing the waste of animals including cats, dogs, hamsters, gerbils, rats and other like domesticated or pet animals. Likewise, the deodorizer is suitable for domesticated birds or other pets such as reptiles. Of course, the invention is useful in other applications such as the application in zoos containing animals, birds, reptiles, etc. However, for simplicity in the foregoing disclosure and the following claims, the animals birds, reptiles, etc. noted above will be referenced herein under the collective term animal.

What is claimed is:

1. A process for deodorizing animal waste comprising reacting the animal waste with a water soluble extract of cherry pits, said extract being identifiable as the soluble solids extracted for at least four hours from cherry pits by an aqueous solvent containing at least 5% water.

2. A process according to claim 1 wherein the cherry pits are ground prior to extracting.

3. A process according to claim 2 wherein the grinding is accomplished at temperatures below 180° F.

4. A process according to claim 3 wherein the natural oil of the cherry pits has been at least partially removed prior to grinding so that the cherry pits contain less than 10% by weight of oil.

5. A process according to claim 4 wherein the ground cherry pits have average particle sizes corresponding to between a No. 6 and a No. 325 U.S. Sieve Series.

6. A process according to claim 1 wherein the solution of the extracted and dissolved solids are separated at a temperature below 180° F. from the nondissolved solids of the cherry pits.

7. A process according to claim 6 wherein the solution of dissolved solids of the separation step is concentrated at a temperature below 180° F.

8. A process according to claim 7 wherein the concentration of dissolved solids in the solution is at least 3% by weight.

9. A process according to claim 8 wherein the concentration of dissolved solids in the solution is at least 7% by weight.

10. A process according to claim 9 wherein the concentration of dissolved solids in the solution is at least 10% by weight.

11. A process according to claim 7 wherein the solution of dissolved solids is dried.

12. A process according to claim 11 wherein the solution of dissolved solids is spray dried.

13. A process according to claim 1 wherein the extract is obtainable by:
   (1) removing at least part of the natural oil from cherry pits until the cherry pits contain less than 10% by weight of oil;
   (2) grinding the cherry pits;
   (3) extracting the ground cherry pits with a liquid aqueous solvent containing at least 5% water for a sufficient time to dissolve and extract the water soluble solids from the ground cherry pits and at least for 4 hours;
   (4) separating the solution of the water soluble solids from the non-dissolved solids of the cherry pits;
   (5) concentrating the dissolved solids in the solution; and
   (6) absorbing the concentrated solution on a porous inert carrier; and wherein each step is carried out at temperatures below 180° F.

14. A process according to claim 13 wherein the ground cherry pits have average particle sizes corresponding to U.S. Sieve Series of about a No. 6 to a No. 325.

15. A process according to claim 14 wherein the concentration of dissolved solids is at least 3% by weight.

16. A process according to claim 15 wherein the concentration of dissolved solids is at least 7% by weight.

17. A process according to claim 13 wherein the carrier is in sheet form.

18. A process according to claim 13 wherein the carrier is in particulate form.

19. The process of claim 13 wherein the solvent is water.

20. The process of claim 1 wherein the solvent is water.

References Cited

UNITED STATES PATENTS

| | | | |
|---|---|---|---|
| 93,607 | 8/1869 | Fish | 424—76 |
| 289,858 | 12/1883 | Rice | 424—76 |
| 696,105 | 3/1902 | Nelson | 424—76 |
| 2,389,770 | 11/1945 | Gaver | 424—76 |
| 3,591,515 | 7/1971 | Lovely | 424—76 |
| 1,897,573 | 2/1933 | Curran | 424—76 |

FOREIGN PATENTS

| | | | |
|---|---|---|---|
| 677,288 | 1929 | France | 424—76 |

OTHER REFERENCES

Chemical Abstracts—vol. 7: $2832^2$; vol. 7: $3525^8$; vol. 10: $2772^4$; vol. 12: $1423^7$; vol. 25: $4322^6$; vol. 33: $3842^2$; vol. 34: $6579^9$; vol. 48; 2288h; vol. 57: 2330d, and vol. 66: 83065m.

The Dispensatory of the U.S.A., 24th ed. J. B. Lippincott Co. (1947), pp. 253–257.

STANLEY J. FRIEDMAN, Primary Examiner

D. B. MOYER, Assistant Examiner

U.S. Cl. X.R.

21—55; 119—1